United States Patent [19]
Colby et al.

[11] Patent Number: 5,952,072
[45] Date of Patent: Sep. 14, 1999

[54] METHOD FOR RESTORING USED RAILROAD TIES AND THE RESTORED RAILROAD TIES FORMED THEREBY

[75] Inventors: Scott Adams Colby; Robert Mark Loomis; Amy Laverne Clement, all of Eugene, Oreg.

[73] Assignee: Willamette Valley Company, Eugene, Oreg.

[21] Appl. No.: 08/871,121

[22] Filed: Jun. 9, 1997

[51] Int. Cl.⁶ .................................................. B32B 3/00
[52] U.S. Cl. ................... 428/63; 238/370; 264/36
[58] Field of Search .............. 428/63; 238/370; 264/36

[56] References Cited

U.S. PATENT DOCUMENTS

| | | | |
|---|---|---|---|
| 626,060 | 5/1899 | Goldie | 238/370 |
| 1,338,444 | 4/1920 | Heim | 238/370 |
| 3,114,331 | 12/1963 | Elliott | 238/370 |
| 3,144,835 | 8/1964 | Pehoski et al. | 104/17.1 |
| 4,070,201 | 1/1978 | Tessenske | 106/281 R |
| 4,134,546 | 1/1979 | Dankert | 238/370 |
| 4,295,259 | 10/1981 | Rhodes et al. | 29/402.18 |
| 4,522,127 | 6/1985 | Miller et al. | 104/17 R |
| 4,626,189 | 12/1986 | Hammer et al. | 425/146 |
| 4,738,808 | 4/1988 | Hammer et al. | 264/40.1 |
| 4,785,692 | 11/1988 | Holmes | 81/27 |
| 4,824,627 | 4/1989 | Hammer et al. | 264/211.21 |

*Primary Examiner*—Alexander Thomas
*Attorney, Agent, or Firm*—Marger Johnson & McCollom, P.C.

[57] ABSTRACT

This invention provides a method for restoring at least one means defining a railroad spike hole located in a used railroad tie. In this way, the restored railroad tie can be reused in subsequent rail replacement operations. The restored railroad tie is capable of having a railroad spike penetrate and be retained within the confines of the restored railroad spike hole without substantial bending problems. The used railroad tie provided has at least one spike hole located therein. In each the means defining a railroad spike hole is formed a polymeric plug. The polymeric plug comprises a substantially non-foaming, non-cellular polymeric material. The polymeric material preferably comprises a polyurethane. The polymeric plug infiltrates and tightly bonds with the railroad spike hole to prevent moisture infiltration. Thus, substantial tie rot due to moisture is impeded, and the leaky railroad spike hole is effectively and efficiently dammed to enable complete filling thereof. The polymeric plug is capable of penetration by and retention of the railroad spike therewithin.

30 Claims, No Drawings

METHOD FOR RESTORING USED RAILROAD TIES AND THE RESTORED RAILROAD TIES FORMED THEREBY

BACKGROUND OF THE INVENTION

This invention relates to a method for restoring used railroad ties having pre-existing spike holes, and more particularly to a method for plugging the pre-existing spike holes in the used railroad ties thereby forming the restored railroad ties which can be reused in rail replacement operations.

All maintenance of the rails in railroad operations typically means removing the rail spikes from the railroad ties. In many instances, these railroad ties are structurally usable because they have not deteriorated to a point requiring replacement. However, reusing these ties requires plugging of any spike holes existing in the railroad tie structure.

Generally, these spike holes can be plugged. In this way, when spikes are re-driven into the holes, the spikes will be firmly anchored within the confines of the ties.

In conventional practice, the ties are plugged by manually driving hardwood dowels into the spike holes. Unfortunately, the use of hardwood dowels results in several problems. First, the dowels do not completely fill the hole. This causes moisture infiltration during use that ultimately accelerates tie rot and in turn the deterioration of the railroad tie structure. Also, as compared with the original unused virgin railroad ties, the hardwood dowels do not effectively anchor the spikes into the structural railroad tie member.

The use of wood substrates and polymeric materials have been described in the prior art patents hereinafter cited, all of which are incorporated by reference in their entirety. Polymeric materials, such as rigid polymers and polymeric foams, have also been employed to fill spike holes in used railroad ties. U.S. Pat. No. 4,295,259 ("U.S. '259") describes filling spike holes in railroad, ties with a foamed polyurethane material. The polyurethane foam material is injected into the holes in wooden ties so that the foaming process takes place in the holes.

An important aspect of the invention described in U.S. '259 is the recognition that the density of the polyurethane foam plays a role in determining the usefulness of material chosen for filling spike holes. The range of about 1 lb/ft$^3$ to 30 lb/ft$^3$ is preferred.

Another major distinction promulgated by the invention of U.S. '259 relates to holding ability of the subject foamed polyurethane material. A summary of the experimental holding force data obtained are contained in Table 1 of U.S. '259. The holding forces shown in Table 1 are averages of the total data obtained. In the table, the material are ranked in decreasing order of their holding ability. The first column is the average of the pull force required to remove the spike after initially being driven into the tie itself ("A"). The next column is the average pull force with the plugging material ("B"). The ratio ("Ratio") of the pulling force with the plugging material with the plugging material to the initial pulling force ("B/A") is listed in the third column. The highest Ratio shown in Table 1 is 0.77. According to U.S. '259, no polymeric filler material employed in the scope of their invention was able to create a filled tie spike hole and having a holding ability greater than 77% of the initial pulling strength of the railroad tie. The data also indicates that these effective filler materials have a density of 30 lbs/ft$^3$ or less.

A major disadvantage of using polymeric foams, for example, is the instability caused to them by environmental moisture. During rainy conditions, or in high humidity, these foamed materials react with water or moisture causing them to foam excessively. This excess foaming substantially reduces the ability of the filled polymeric material to anchor the tie. Moreover, polymeric foams, such as for example polyurethane foams, can stove-pipe out of a spike hole due to the reaction of a polyurethane material with water. This creates several negative consequences. First, it causes the polyurethane filler material to exhibit reduced Spike Withdrawal Lateral Resistance. Secondly, it also creates copious quantities of excess foam debris (which look like large snow balls) to dispose of thereby needlessly wasting time and materials. The debris typically must be sheared off the tie plate prior to re-spiking. This makes it difficult for a user to drive a spike into the pre-existing hole because the excess foam interferes with an effective and efficient re-spiking operation. Stated another way, this also presents a significant increase in the time required to complete the re-spiking operation for users in the field.

Third, another disadvantage with regard to use of polymeric foam filling agents is tie rot. This problem results from moisture infiltration into the space formed between the foam material and the spike hole wood surface.

Due to the problems as discussed above, the use of polymeric foam materials to fill spike holes in railroad ties have had limited commercial success in the railroad industry over the past twenty years. Therefore, wood plugs continue to dominate the railroad tie maintenance industry.

Other prior patents, such as U.S. Pat. No. 4,522,127, disclose a railroad tie plug driving apparatus. The apparatus drives plugs into railway tie holes remaining after the removal of at least one rail and its associated tie plate and rail spikes from the railway ties. Other machines for driving railroad tie plugs are described in U.S. Pat. No. 3,114,331 and U.S. Pat. No. 3,144,835. Railroad tie plugs of various configurations are disclosed in U.S. Pat. No. 620,060 and U.S. Pat. No. 1,338,444. U.S. Pat. No. 4,785,692, is directed to a tool for driving wooden plugs into wooden spike holes of railroad ties following removal of railroad spikes from the wooden tie prior to track regauging and/or replacement.

U.S. Pat. No. 4,626,189, U.S. Pat. No. 4,738,808, and U.S. Pat. No. 4,824,627, each relate to a method of making a molded plastic product. A large wooden object such as a railroad tie can be molded within the plastic material.

U.S. Pat. No. 4,070,201 discloses the use of a spike hole plugging material. A method is also provided involving a substantially uniform mixture of about 25–75% granular abrasive material, and about 25–75% granular plastic material. The problems associated with this railroad tie spike hole plugging technique is clearly set forth in the hereinafter cited U.S. Pat. No. 4,295,259 patent.

U.S. Pat. No. 4,134,546 is directed to a cylindrical insert of cellular plastic which is introduced into a wooden rail support structure. The insertion process is accomplished by boring a hole into the wooden structure. Then, the cylindrical plastic foam insert is introduced into the hole. Finally, a tie plate and a rail are positioned thereon and can be fastened thereto for receiving and holding a fastening device such as a rail tie.

Therefore, a need exists for an effective and efficient method for filling spike holes in used railroad ties which will then produce restored filled railroad ties which can be reused in rail replacement operations. Such a method should preferably have the following attributes: (a) firmly anchoring the spike into the tie; (b) deeply infiltrate the small cracks and crevices in the wood surface forming the spike hole to impede tie rot due to moisture; (c) bond tightly with the wood to prevent moisture infiltration; (d) be re-spikable within a relatively short time after dispensing; (e) displace standing water in tie holes during the hole filling operation; (f) dams leaky tie holes to enable complete filling; capable of having the railroad spike penetrate the filled material without substantial bending problems. As for the filled portion of the railroad tie, it should anchor the spike in a manner which is comparable to introducing a railroad spike into the virgin wood portion of the subject railroad tie.

SUMMARY OF THE INVENTION

The needs expressed above have been fulfilled by restored railroad tie in which the existing spike holes have been filled according to the teachings of the present invention.

More specifically, this invention provides a method for restoring at least one means defining a railroad spike hole located in a used railroad tie. In this way, the restored railroad tie can be reused in subsequent rail replacement operations. The restored railroad tie is capable of having a railroad spike penetrate and be retained within the confines of the restored railroad spike hole without substantial bending problems. The used railroad tie provided has at least one railroad spike hole located therein.

A polymeric plug is formed in each railroad spike hole. Typically, the above-described needs are met by employing a non-foaming and/or non-cellular and/or high-density polymeric material. The polymeric material preferably comprises a polyurethane. The polymeric plug infiltrates and tightly bonds within the railroad spike hole to prevent moisture infiltration. Thus, substantial tie rot due to moisture is impeded, and the leaky railroad spike hole means is effectively and efficiently dammed to enable complete filling thereof. The polymeric plug is capable of penetration by, and retention of the railroad spike therewithin.

As previously and hereinafter defined in detail herein, the two tests used to measure the "holding" ability of a filler material to anchor spikes to railroad ties are average Spike Withdrawal Resistance ("SWR") and average Spike Lateral Resistance ("SLR").

The SWR Ratio and the SLR Ratio is determined by comparing the SWR and/or the SLR of the filled material with the SWR and/or the SLR of the portion of that railroad tie which does not have a spike hole located therein. This allows direct comparison of the anchoring ability of different reusable railroad ties on an absolute basis without regard to individual difference in SWR and/or SLR. Moreover, SWR Ratio of the restored railroad tie of the present invention is preferably at least about 0.90, more preferably at least about 0.95, and most preferably at least about 1.00. The SWL Ratio of the restored railroad tie of the present invention is preferably at least about 0.90, more preferably at least about 0.95, and most preferably at least about 1.00.

Contrary to the teaching of U.S. '259 which employ polymeric foams having a density of up to 30 lb/ft$^3$, the polymeric plug of the subject invention typically has a density of preferably greater than about 30 lb/ft$^3$ up to 120 lb/ft$^3$, preferably from about 35 lb/ft$^3$ up to 110 lb/ft$^3$, more preferably from about 40 lb/ft$^3$ up to 105 lb/ft$^3$, and most preferably from about 60 lb/ft$^3$ to 100 lb/ft$^3$.

The foregoing and other objects, features and advantages of the invention will become more readily apparent from the following detailed description of a preferred embodiment which proceeds with reference to the drawings.

DETAILED DESCRIPTION OF A PREFERRED EMBODIMENT

The method of the present invention for restoring railroad spike holes located in a used railroad tie, which is provided so that the restored railroad tie formed thereby can be reused in subsequent rail replacement operations, is affected by the formation in each such railroad spike hole of a non-cellular polymeric plug formed of a non-foaming, non-cellular polymeric material, typically a non-cellular polyurethane material.

Equipment for dispensing the isocyanate and polyol(s) employed in producing non-foaming, non-cellular polyurethane, such as the Mixus™ polyurethane dispensing equipment manufactured by Willamette Valley Company of Eugene, Oreg., is commercially available. Typically, the two components which form the subject polyurethane filler material are pumped from storage tanks to a proportioning unit where the components are measured out according to a specified ratio. A known amount of each material is then separately pumped to a dispensing unit. The components are mixed in the dispensing unit and then introduced into the spike hole of the railroad tie.

The polyurethane reaction can include a catalyst system to accelerate the reaction between the isocyanate and the hydroxyl groups of each polyol. The catalysts utilized in the catalyst system of this invention for accelerating the subject non-cellular polyurethane formation reactions can include tin, mercury, lead, bismuth, zinc and various amine compounds such as are described in U.S. Pat No. 5,011,902, which is incorporated herein in its entirety by reference.

In certain instances it may be desirable to add a chain extender to complete the formulation of polyurethane polymers by reacting isocyanate groups of adducts or prepolymers. Examples of some types of polyol and amine chain extenders include 1,4 butanediol, diethylene glycol, trimethylol propane and hydroquinone di(beta hydroxyethyl ether). The subject polyurethane compositions may additionally incorporate diluents, fillers, compatibilizers, thixotropes, pigments and anti settling agents. Suitable fillers include barium sulfate, calcium sulfate, calcium carbonate, silica, and clay particles, such as aluminum silicates, magnesium silicates, ceramic and glass microspheres and kaolin. Suitable compatibilizers are hydroxy containing organic compounds, preferably hydroxy containing monocyclic arenes such as ethoxylated nonyl phenol, which compatibilize the polyol and aromatic diisocyanate reactants in the formulation. Suitable diluents include hydrotreated paraffinic oils, phthlates, carbonates, hydrotreated naphthenic oils, petroleum solvents, aliphatic solvents and propylene carbonate.

The subject method for restoring railroad spike holes located in used railroad ties employs a two component non-cellular polyurethane material to fill railroad tie spike holes. A preferred polyurethane formulation comprises a multi-component system, wherein isocyanate ranges from about 1 to about 5 parts, and most preferably from about 1 to about 4 parts, to each part of the total polyol component by volume.

The Association of American Railroads ("AAR") and the University of Illinois ("U of I") have recently issued an independent performance evaluation of the leading railroad tie spike hole filler materials ("AAR Report"). The AAR and the U of I performed a series of spike pull-out resistances tests on selected railroad tie specimens to evaluate current tie plugging remedial treatments and to further develop performance requirements. These tests are similar to the experimental load force data obtained in TABLE 1 of U.S. '259. The AAR report also includes spike lateral resistance data which is not covered in U.S. '259.

More specifically, maximum spike drive in force, maximum spike withdrawal force, and maximum lateral displacement resistances were recorded for each 7"×9"×18" specimen. Spike resistance tests used 79 oak cross ties removed from revenue service and donated by Illinois Central ("IC"), Burlington Northern Sante Fe ("BNSF"), and Conrail. Tie plugging materials tested include two polyurethane foams, a phenolic foam, an epoxy, and hardwood plugs. The non-cellular polyurethane filler materials of the present invention were separately tested under the same conditions by the U of I. For comparison, two control spike holes, a new hole, and an old hole were tested without any remedial treatment to serve as best and worst case scenarios, respectively.

Results indicate that, excluding the non-cellular polymeric materials of the present invention, a new hole provided the best results, i.e., highest resistance. The railroad ties which were filled with the subject non-cellular polymeric materials were comparable to or better than a new hole. As expected, and except as provided above, an old hole almost always yielded the lowest resistance. Adding a remedial treatment to a spike hole will not necessarily make a difference if a tie is structurally degraded and/or too old. The polyurethane foams and phenolic foams provided initial strength equal to hardwood plugs in the spike lateral resistance and spike pull out tests. All results reported were considered to be statistically significant at a 95 percent confidence level.

Testing consisted of three spike resistance tests. Maximum spike drive in force, maximum spike withdrawal force, and the maximum load produced by displacing the cut spike head laterally by 0.20 inch were recorded for each rail seat area tested. New standard cut spikes (measuring ⅝"×⅝"×6½") were used.

Cut spikes were driven into the spike hole at a rate of 2 inches/minute, then displaced laterally at a rate of 0.1 inch/minute, and lastly, pulled out at a rate of 0.3 inch/minute. The cross tie specimens were conditioned to constant weight and moisture content in a climate chamber for 10 days before testing. A relative humidity of 90±5°F. percent at a temperature of 68±5°F. were the conditions maintained in the chamber. Tests were performed on six to eight spike holes per specimen.

Tests were conducted on 38 BNSF ties that were removed from service during a concrete tie program. The BNSF ties were between 20 and 25 years old. IC donated twenty 30 year old ties, while the 21 ties donated by Contrail were 25 years of age. Both the IC and Contrail ties were removed from track for selective replacement as part of program renewals. Not every treatment was used on each group of ties due to the limited quantity of treatment material. Additionally, two baseline spike tests were conducted on the ties using one old hole and one new hole. The old hole spike property tests were conducted by driving a spike into an existing spike hole without any treatment. In the new hole tests, a new spike hole was created in the tie plate area; again, without any treatment. The new hole and old hole served as upper and lower limits of strength resistance for each tie.

Each set of tests exhibited unique results in the three spike property tests. Spike resistance forces appeared the lowest for the IC ties. The younger, more structurally sound Contrail and BNSF ties provided higher and similar values. The following empirical models were used to predict those values:

Spike Drive Ins (lbs.): P=9098 [133.98×AGE]

Spike Lateral Resistance (lbs. at 0.2 inch): P=2923.4−[54×age]

Spike Withdrawal (lbs.) P 7871−[158.71×age]

The age value used is 25 years

After the spike resistance tests, the ties were cut through the tie plate area to observe how the remedial treatments interacted with the wood and spike. Cut spikes withdrawn from the polyurethane and phenolic foams exhibited oily surface indicating a lack of bonding. Spikes inserted in the epoxy treatment did not bond; however, spikes inserted within the epoxy ½ treatment showed better bonding at the wood to spike interface. The hardwood plugs were either crushed or squeezed during the spike insertion test resulting in frequent splitting of the spike holes.

Listed below are initial requirements for remedial treatments, as follows:

Service as a filler material or a wedge in the spike hole

Allow spike removal with minimal damage to the tie plate area

Out perform "old hole" vertical and lateral spike resistance tests

"Set" in 10– minutes

Be easily applicable to facilitate smooth rail gang operation

Be non-toxic and require no licensing or disposal permits

Remain stable over −20°F. to +120°F.

Remain stable in saturated wood

Be non-corrosive to cut spikes

Retain strength with load and weathering cycles

EXAMPLE 1

The AAR Report included an evaluation of polyurethane foams, epoxy foams, and wood dowels. The non-cellular polyurethane material of the present invention were also evaluated by the U of I. The two tests conducted used by AAR to measure the ability of a filler material to anchor spikes to railroad ties were determined for the average Spike Withdrawal Resistance ("SWR") and the average Spike Lateral Resistance ("SLR"). The SWR Ratio and the SLR Ratio was determined by comparing the SWR/SLR of the filled material with the SWR/SLR of the railroad tie per se.

| FILLER MATERIAL | SPIKE WITHDRAWAL RESISTANCE (AVG) | SWR RATIO |
| --- | --- | --- |
| Wood Plug | 3900 | 0.68 |
| Phenolic Foam | 3200 | 0.56 |
| Polymeric Foam A | 3300 | 0.58 |
| Polymeric Foam B | 4100 | 0.72 |
| Epoxy Foam | 2100 | 0.37 |
| Epoxy ½ Foam | 4800 | 0.84 |
| No Filler In Hole | 3200 | 0.56 |

| FILLER MATERIAL | SPIKE LATERAL RESISTANCE (AVG) | SLR RATIO |
| --- | --- | --- |
| Wood Plug | 1300 | 0.72 |
| Phenolic Foam | 1300 | 0.72 |
| Polymeric Foam A | 1200 | 0.67 |
| Polymeric Foam B | 1400 | 0.78 |
| Epoxy Foam | 1100 | 0.61 |
| Epoxy ½ Foam | 1100 | 0.61 |
| No Filler In Hole | 1500 | 0.83 |

The SWR Ratio ranged from 0.37 to 0.84 and the SLR Ratio ranged from 0.61 to 0.83, respectively, for filler materials listed above.

EXAMPLE 2

Using the polyurethane formulation set forth below, a non-cellular, non-foaming polyurethane material (Polyurethane A) was employed to produce a non-cellular polymeric plug for filling railroad spike holes in used wooden railroad ties. The polyurethane formulation comprised two parts by volume of a polyol resin which was mixed with one part of an aromatic polyisocyanate. The two liquids mix readily using a spatula and cup, or using standard two component dispensing equipment such as the Mixus dispensing equipment that is manufactured by the Willamette Valley Company of Eugene, Oreg. The liquid mix was poured into the spike hole and allowed to cure to a solid prior to re-spiking the hole. The reaction time to form a non-cellular polyurethane solid was about 30 seconds.

| COMPONENT | AMOUNT (grams) |
|---|---|
| Resin | |
| PPG based 1000 MW triol | 500 |
| PPG based 3000 MW triol | 60 |
| 1–4 Butane Diol | 40 |
| 7 Micron Calcium Carbonate | 800 |
| 16 wgt % Bismuth Neodecanoate | 3 |
| 19 wgt % Zinc Neodecanoate | 3 |
| Fumed Silica | 3 |
| 3 Angstrom Molecular Sieve | 15 |
| Silicone Surfactant | 4 |
| Polyisocyanate | |
| Polymeric MDI (31% NCO) | 550 |

| FILLER MATERIAL | SPIKE WITHDRAWAL RESISTANCE (AVG) | SWR RATIO |
|---|---|---|
| Polyurethane A | 5700 | 1.00 |

| FILLER MATERIAL | SPIKE LATERAL RESISTANCE (AVG) | SLR RATIO |
|---|---|---|
| Polyurethane A | 2200 | 1.22 |

Polyurethane A cured in approximately ½ minute and had a density of about 90 lb./ft$^3$. Testing was performed one week after the tie holes were filled.

The analytical data above clearly indicates that railroad ties having a polymeric plug formed of a non-cellular polyurethane material substantially outperformed all other filler materials including the polymeric materials described in Table 1 of U.S. '259, which included polymeric foams and wooden plugs, and the materials tested by the U of I and described in Example 1 herein, including polyurethane foams, epoxy foams, and wood dowels. In fact, the subject polymeric materials outperformed polyurethane foams in both average spike withdrawal resistance & average spike lateral resistance.

The polymeric plugs of the this invention were also the only filler materials that had comparable or better Spike Withdrawal Resistance & Spike Lateral Resistance values than a railroad tie with no previous hole present (i.e., virgin wood). This has also been demonstrated by comparing the data in Table 1 of U.S. '259, and Examples 1 and 2 above.

Having illustrated and described the principles of my invention in a preferred embodiment thereof, it should be readily apparent to those skilled in the art that the invention can be modified in arrangement and detail without departing from such principals. I claim all modifications coming within the spirit and scope of the accompanying claims.

We claim:

1. A method for restoring at least one means defining a railroad spike hole located in a used railroad tie, so that the restored railroad tie can be reused in subsequent rail replacement operations, said restored railroad tie, after formation thereof, being capable of having a railroad spike penetrate and be retained within the confines of the restored railroad spike hole means without substantial bending problems, which comprises:

providing said used railroad tie having at least one means defining a railroad spike hole located therein; and preforming in situ within each said means defining a railroad spike hole, a solid polymeric plug formed of a polymeric material consisting essentially of a substantially non-foaming, non-cellular polymeric material, said solid polymeric plug infiltrating and tightly bonding with the railroad spike hole means to prevent moisture infiltration thereby impeding substantial tie rot due to moisture, and to dam the leaky railroad spike hole means and substantially completely filling said railroad spike hole means so that said railroad spike can be subsequently re-driven through, and be firmly anchored within, the confines the used railroad tie;

said solid polymeric plug being capable of penetration by and retention of said railroad spike so that it is firmly anchored within said solid polymeric plug and within the confines of the used railroad tie, said solid polymeric plug having an SWR Ratio of at least about 0.90.

2. The method of claim 1 wherein said polymeric material comprises a polyurethane.

3. The method of claim 1 wherein said SWR Ratio is at least about 0.95.

4. The method of claim 1 wherein said SWR Ratio is at least about 1.00.

5. The method of claim 1 wherein said SWL Ratio is at least about 0.90.

6. The method of claim 1 wherein said SWL Ratio is at least about 0.95.

7. The method of claim 1 wherein said SWL Ratio is at least about 1.00.

8. The method of claim 1 wherein said polymeric plug has a density of greater than about 30 lb/ft$^3$ to 120 lb/ft$^3$.

9. The method of claim 1 wherein said polymeric plug has a density of from about 35 lb/ft$^3$ to 110 lb/ft$^3$.

10. The method of claim 1 wherein said polymeric plug has a density of from about 40 lb/ft$^3$ to 105 lb/ft$^3$.

11. The method of claim 1, which further includes the step of re-driving said railroad spike through the railroad spike hole means so that it penetrates and is retained by and firmly anchored within said solid, preformed polymeric plug and within the confines of the used railroad tie.

12. The method of claim 1, which further includes the step of forming said solid polymeric plug of a polymeric material consisting essentially of a substantially non-foaming, non-cellular liquid polymeric material.

13. A restored used railroad tie that can be reused in subsequent rail replacement operations, comprising a railroad tie having at least one means defining a railroad spike hole located therein, said restored railroad tie, after formation thereof, being capable of having a railroad spike penetrate and be retained within the confines of the restored railroad spike hole means without substantial bending problems; and a solid polymeric plug preformed in situ in each said means defining a railroad spike hole, said solid polymeric plug formed of a polymeric material consisting essentially of a non-cellular, non-foaming polymeric material, said polymeric material infiltrating and tightly bonding with the railroad spike hole means to prevent moisture infiltration thereby impeding substantial tie rot due to moisture, and to dam the leaky railroad spike hole means and substantially completely filling said railroad spike hole means so that said railroad spike can be subsequently re-driven through the railroad spike hole means and be firmly anchored within the confines of the used railroad tie;

said solid non-foaming, non-cellular polymeric plug being capable of penetration by and retention of said railroad spike so that it is firmly anchored within said solid polymeric plug and within the confines of the used railroad tie, said solid polymeric plug having an SWR Ratio of at least about 0.90.

14. The restored used railroad tie restored used railroad tie of claim 13 wherein said polymeric material comprises a polyurethane.

15. The restored used railroad tie of claim 13 wherein said SWR Ratio is at least about 0.95.

16. The restored used railroad tie of claim 13 wherein said SWR Ratio is at least about 1.00.

17. The restored used railroad tie of claim 13 wherein said SWL Ratio is at least about 0.90.

18. The restored used railroad tie of claim 13 wherein said SWL Ratio is at least about 0.95.

19. The restored used railroad tie of claim 13 wherein said SWL Ratio is at least about 1.00.

20. The restored used railroad tie of claim 13 wherein said polymeric plug has a density of greater than about 30 lb/ft$^3$ to 120 lb/ft$^3$.

21. The restored used railroad tie of claim 13 wherein said polymeric plug has a density of from about 35 lb/ft$^3$ to 110 lb/ft$^3$.

22. The restored used railroad tie of claim 13 wherein said polymeric plug has a density of from about 40 lb/ft$^3$ to 105 lb/ft$^3$.

23. The method of claim 13, which further includes the step of forming said solid polymeric plug of a polymeric material consisting essentially of a substantially non-foaming, non-cellular liquid polymeric material.

24. A method for restoring at least one means defining a railroad spike hole located in a used wooden railroad tie, so that the restored railroad tie can be reused in subsequent rail replacement operations, said restored railroad tie being capable of having a railroad spike penetrate and be retained within the confines of the restored railroad spike hole means without substantial bending problems, which comprises:

providing said used railroad tie having at least one means defining a railroad spike hole located therein;

introducing an isocyanate material and a polyol material into each said means defining a railroad spike hole; and preforming in situ in each said means defining a railroad spike hole, a solid polymeric plug formed of a substantially non-foaming, non-cellular polyurethane material, said in situ preformed solid polyurethane polymeric plug infiltrating and tightly bonding with the railroad spike hole means to prevent moisture infiltration thereby impeding substantial tie rot due to moisture, and to dam the leaky railroad spike hole means and substantially completely filling said railroad spike hole means so that said railroad spike can be subsequently re-driven through the railroad spike hole means and be firmly anchored within the confines of the used railroad tie;

said solid polymeric plug being capable of penetration by and retention of said railroad spike so that it is firmly anchored within said polymeric plug and within the confines of the used railroad tie, said solid polymeric plug having an SWR Ratio of at least about 0.90.

25. The method of claim 24, which further includes the step of introducing a liquid isocyanate material and a liquid polyol material into each said means defining a railroad spike hole.

26. A method for restoring at least one means defining a railroad spike hole located in a used railroad tie, so that the restored railroad tie can be reused in subsequent rail replacement operations, said restored railroad tie, after formation thereof, being capable of having a railroad spike penetrate and be retained within the confines of the restored railroad spike hole means without substantial bending problems, which comprises:

providing said used railroad tie having at least one means defining a railroad spike hole located therein; and forming in situ within each said means defining a railroad spike hole, a solid polymeric plug formed of a polymeric material consisting essentially of a non-foaming, non-cellular polyurethane material, said solid polymeric plug infiltrating and tightly bonding with the railroad spike hole means to prevent moisture infiltration thereby impeding substantial tie rot due to moisture, and to dam the leaky railroad spike hole means and substantially completely filling said railroad spike hole means so that said railroad spike can be subsequently re-driven through the railroad spike hole means and be firmly anchored within the confines of the used railroad tie;

said solid polymeric plug being capable of penetration by and retention of said railroad spike so that it is firmly anchored within said solid polymeric plug and within the confines of the used railroad tie, said solid polymeric plug having an SWR Ratio and an SWL Ratio of at least about 0.90, and a density of greater than about 30 lb/ft$^3$ up to 120 lb/ft$^3$.

27. The method of claim 26, which further includes the step of forming said solid polymeric plug of a polymeric material consisting essentially of a substantially non-foaming, non-cellular liquid polymeric material.

28. A method for restoring at least one means defining a railroad spike hole located in a used railroad tie, so that the restored railroad tie can be reused in subsequent rail replacement operations, said restored railroad tie, after formation thereof, being capable of having a railroad spike penetrate and be retained within the confines of the restored railroad spike hole means without substantial bending problems, which comprises essentially of:

providing said used railroad tie having at least one means defining a railroad spike hole located therein; and forming in situ within each said means defining a railroad spike hole, a solid polymeric plug formed of a polymeric material consisting essentially of a substantially non-foaming, non-cellular polymeric material, said solid polymeric plug infiltrating and tightly bonding with the railroad spike hole means to prevent moisture infiltration thereby impeding substantial tie rot due to moisture, and to dam the leaky railroad spike hole which substantially completely fills said railroad spike hole means so that said railroad spike can be subsequently re-driven through the railroad spike hole means and be firmly anchored within the confines of the used railroad tie;

said solid polymeric plug being capable of penetration by and retention of said railroad spike so that it is firmly anchored within said solid polymeric plug and within the confines of the used railroad tie, said solid polymeric plug having an SWR Ratio of at least about 0.90.

29. The method of claim 28, which further includes the step of re-driving said railroad spike through the railroad spike hole means so that it penetrates and is retained by and firmly anchored within said solid polymeric plug and within the confines of the used railroad tie.

30. The method of claim 28, which further includes the step of forming said solid polymeric plug of a polymeric material consisting essentially of a substantially non-foaming, non-cellular liquid polymeric material.

* * * * *

UNITED STATES PATENT AND TRADEMARK OFFICE
CERTIFICATE OF CORRECTION

PATENT NO. : 5,952,072
DATED : September 14, 1999
INVENTOR(S) : Colby et al.

It is certified that error appears in the above-identified patent and that said Letters Patent is hereby corrected as shown below:

Column 4,
Line 52, delete the first instance of "1" and insert -- 5 --; and delete "5" and insert -- 1 --; and delete the second instance of "1" and insert -- 4 --
Line 53, delete "4" and insert -- 1 --

Column 5,
Line 6, after "an epoxy" and insert -- foam --
Line 48, delete "Contrail" and insert -- Conrail --
Line 49, delete "Contrail" and insert -- Conrail --
Lines 64-65, delete "Contrail" and insert -- Conrail --

Column 6,
Line 1, after "9098" insert a minus (-) sign.

Signed and Sealed this

Twenty-sixth Day of March, 2002

Attest:

Attesting Officer

JAMES E. ROGAN
Director of the United States Patent and Trademark Office